J. SCHWERTNER.
AUTOMATIC PLAYING APPARATUS.
APPLICATION FILED JAN. 9, 1913.
Reissued Feb. 25, 1913.
13,536.
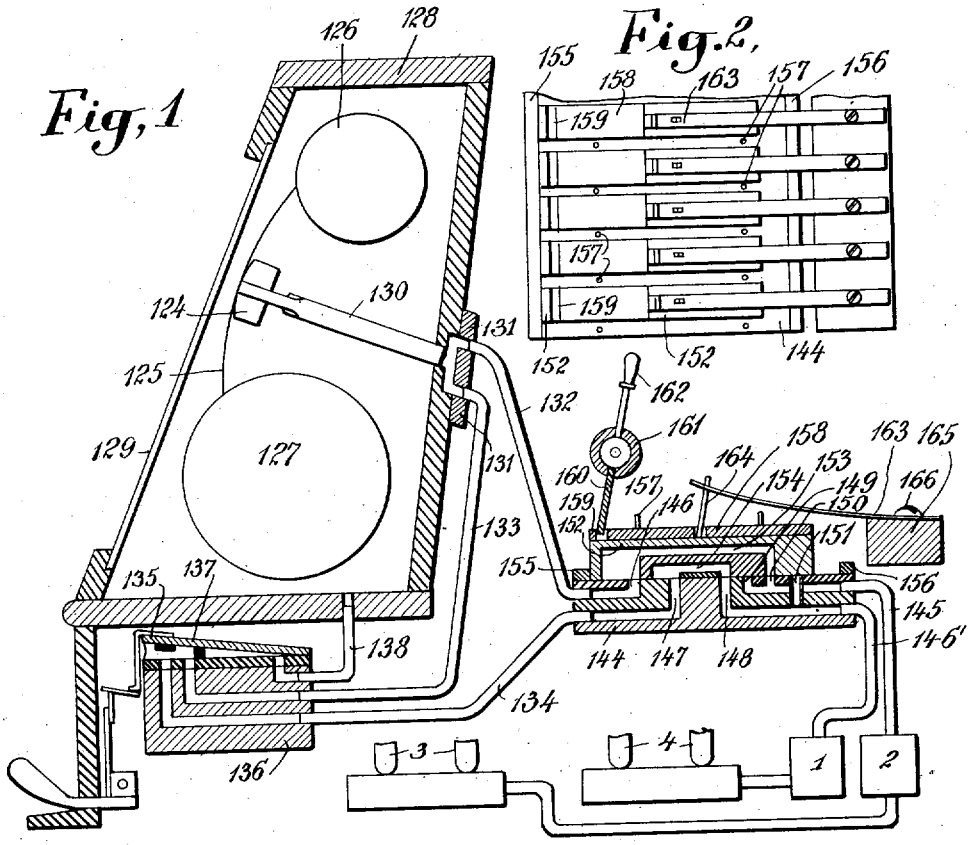
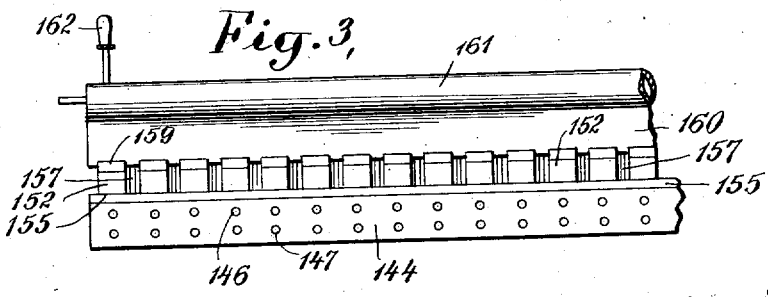
WITNESSES
Geo. W. Harris
John O. Gempler
INVENTOR
Joseph Schwertner
BY
Kenyon & Kenyon
ATTORNEYS
COLUMBIA PLANOGRAPH CO., WASHINGTON, D. C.

UNITED STATES PATENT OFFICE.

JOSEPH SCHWERTNER, OF NEW YORK, N. Y., ASSIGNOR, BY DIRECT AND MESNE ASSIGNMENTS, TO HEERWAGEN COMPANY, A CORPORATION OF NEW YORK.

AUTOMATIC PLAYING APPARATUS.

13,536. Specification of Reissued Letters Patent. Reissued Feb. 25, 1913.

Original application filed December 8, 1910, Serial No. 596,196. Divided and application filed March 14, 1911, Serial No. 614,308. Original No. 1,034,520, dated August 6, 1912. Application for reissue filed January 9, 1913. Serial No. 741,105.

*To all whom it may concern:*

Be it known that I, JOSEPH SCHWERTNER, a citizen of the United States, and a resident of New York, county of New York, and State of New York, have invented certain new and useful Improvements in Automatic Playing Apparatus, of which the following is a specification.

My invention relates to improvements in musical instruments, and is more especially directed to improvements in self-playing organs.

This application is a division of my prior application, Serial No. 596,196; filed December 8, 1910, for musical instruments.

In organs of the class mentioned and which are provided with great and swell actions, or other similar actions, it has been suggested that both actions be operated pneumatically through the control of the trackerboard.

One object of my invention is to provide a new arrangement of connections from the great and swell organs or the like to the tracker whereby both great and swell or other speaking devices or either of them alone may be sounded and whereby any desired number of the swell organ speaking devices or the great organ speaking devices may be silenced while the others are allowed to speak.

A further object of my invention is to provide detailed improvements with respect to the features above mentioned, whereby their operation is rendered more efficient and simple and great cheapness of construction and efficiency in maintenance is attained.

Further objects, features and advantages will more clearly appear from the detailed description given below, taken in connection with the accompanying drawings, which form a part of this specification.

Referring to the drawings, Figure 1 is a section through the tracker and adjacent parts of a self-playing organ, sufficient to illustrate my invention and make its application clearly understood to those skilled in the art. Fig. 2 is a detail plan view of a portion of the reversing valves, a section of one of which is shown in Fig. 1. Fig. 3 is a front view of a portion of the reversing slide valves.

Referring to the drawings, in order that the organ or other instrument may be automatically operated, the same is provided with a tracker board 124 (see Fig. 1), over which a perforated music sheet 125 is arranged to pass by means of reels 126 and 127 in any usual or well known manner. The parts 124, 125, 126 and 127 are inclosed within a windchest or suitable chamber 128 having a glass front at 129. Any well known means may be provided for producing suitable wind pressure within 128. The tracker board 124 is provided with the usual series of tracker openings and with a duct 130 connecting with each tracker opening. At the point 131 the duct 130 splits into two separate ducts 132 and 133 respectively. The duct 133 is arranged to be connected with a duct 134 to form a continuous air passage by means of a coupling valve having a valve closure 135. For this purpose the ducts 133 and 134 extend into a block 136, valve closure 135 being arranged to cover the end of the duct 134. The valve closure is operated by a lever member 137. The right-hand chamber in the device, however, is continuously supplied with air under pressure by means of a duct 138 connected with the chest 128. The valve closures 135 are arranged to be independently operated and raised manually in any well known or other manner. These valve closures 135 are normally arranged to control the swell organ action when the instrument is being automatically played and by means thereof any note or notes may be accented by means of the swell organ action, as desired, and at the will of the operator.

While such a coupling device as shown at 136, 136, forms an important element in some combinations which are improvements claimed herein, nevertheless many of the specific features of construction of this device are not claimed herein, and for this reason it is only shown more or less diagrammatically. A good form of device to be used in this connection, however, is clearly shown and described in my co-pending application, Serial No. 585,585, filed December 30, 1909.

The ducts 132 and 134 lead into one end of a block 144, forming the base of a reversing slide valve. Leading from the other end of the block 144 are corresponding ducts 145 and 146′. Opening into the top face of the block 144 are passages 146, 147, 148, 149, 150 and 151. The passage 146 is connected with the duct 132 and the passage 147 is connected with the duct 134. The passages 148 and 151 are connected with the duct 146′, and the passages 149 and 150 are connected with the duct 145, as clearly shown. The ducts 145 and 146′ lead to any suitable intermediate apparatus (indicated diagrammatically at 1 and 2) with controlling pneumatics which control the action of the speaking devices 3, 3 and 4, 4 of great and swell organs respectively. Upon the block 144 is arranged the slide valve 152, having air passages 153 and 154. Stops 155 and 156 are provided at either end of the block 144 to limit the extreme positions of movement of the slide valve 152. When in the left hand position, as shown in the drawing, the reversing slide valve connects the duct 132 with the duct 145 and the duct 134 with the duct 146′. If, now, the slide valve 152 be moved to its position to the right, the duct 132 will be connected to the duct 146′ and the duct 134 will be connected to the duct 145. It being understood that there is a plurality of slide valves 152, one corresponding to each tracker opening, it will be seen that there are provided two sets of air ducts 132 and 134 connected to the tracker board 124 and two other sets of air ducts 145 and 146′ and a set of reversing valves for connecting the ducts of one of said first mentioned sets with the ducts of one of said second mentioned sets, and the ducts of the other of said first mentioned sets with the ducts of the other of said second mentioned sets in direct and reverse manner.

Each valve closure 152 is adapted to slide over its respective valve seat and each is pressed toward its seat independent of its neighbor and these valves are therefore independently movable on their seats. In order to properly guide them in their movement pins 157 are driven into the block 144 between the sliding parts 152. In order to more perfectly cause the sliding parts or valves 152 to rest upon their seats and prevent leakage, each one is weighted upon its top by means of a piece of metal 158, preferably lead. A groove 159 is provided in the top of each of these sliding parts 152 and a single metal bar 160 has its lower edge resting within all of said grooves 159. The bar, or plate 160 is secured to a rotating rod or pipe 161 having at one end secured thereto a handle 162, so that upon moving the handle 162 all of the sliding valves or members 152 may be moved into one position or the other simultaneously, thus reversing the connections between the ducts 132 and 134, and 145 and 146. In order to more firmly press the sliding members 152 to their seats, each is provided with a flat spring 163 having at one end an aperture therethrough, through which extends one end of the link 164. The link 164 has a collar near said end in order to properly position the end of the spring on the link 164. The other end of the link 164 extends into a groove or depression in the member 152, so as to form a sort of pivotal connection therewith. Each member 152 is provided with an independent spring 163 and all of these springs are secured to a bar 165 by means of screws 166, as clearly shown in Fig. 1. From a further consideration of Fig. 1, it will be seen that in the position shown, the spring 163, acting through the link 164 tends to force the member 152 toward the left or into its left-hand position. Upon moving the handle 162 and forcing the member 152 to the right and after the same has passed a predetermined point in its movement it will be clear that the spring 163 in pressing downwardly and acting through the link 164 will tend to move the member 152 into its right-hand position. That is, after the dead center has been passed, the springs 163 tend to move the various slide valves into their right-hand or left-hand positions, as the case may be.

The operation of the features just above set forth may be described as follows: Upon an opening in the tracker sheet 125, registering with one of the ducts 130, air will be forced into the duct 130 in the usual manner. Assuming that it is desired that both the corresponding great and swell organ actions are desired to be operated in order to accent the note corresponding to the registering aperture; then the air will pass through the duct 130, duct 132, passage 146, passage 163, passage 150, duct 145, thus causing the corresponding speaking device of the great organ to speak. For the swell organ action the air under pressure passes through the duct 130, through the duct 133, through the coupling valve formed by valve closure 135 and its seat, through duct 134, passage 147, passage 154, passage 148, duct 146′, thus causing the corresponding swell organ device to speak. If, on the other hand, the valve closure 135 be in its lower position, thus closing the valve in the ducts 133, 134, the air from the ducts 130 and 133 cannot rush into the ducts 134 and 146 and therefore under these conditions the swell organ speaking device would not be sounded. When it is desired that the normal playing take place on the swell organ and accenting take place on the great organ, the handle 162 is thrown, thus reversing the connection between ducts 145, 146′ and 132, 135.

The particular arrangement of the reversing slide valves is of great importance.

Prior devices have been subject to great leakage and inaccuracy of alinement and general inefficiency of operation and construction. I overcome these difficulties by the arrangement described. The spring and weights keep the sliding members firmly against their seats, thus preventing leakage, and also conducing to this is the feature that the reversing devices are split up into a plurality of sliding members, thus allowing each to more properly seat itself. The stops and dead center spring arrangement conduce to the accurate alinement or positioning of the sliding members, as well as increasing their rapidity of movement and ease of operation.

Although I have described my improvements with respect to one particular embodiment thereof, and in great detail, nevertheless, I do not desire to be limited to such details, since it is obvious that many changes and modifications may well be made without departing from the spirit and scope of my invention and improvements.

Having thus fully and clearly described my improvements, what I claim as new and desire to secure by Letters Patent, is:

1. The combination of a tracker board and speaking devices to be controlled thereby, a reversing slide valve, two air ducts leading from a single opening in the tracker to said slide valve, two air ducts leading from the slide valve for controlling two different speaking devices respectively, whereby the slide valve may reverse the connections between said ducts and a valve located in one of said first mentioned ducts.

2. In an organ, the combination of great and swell actions, a tracker board, an air duct for controlling a great action, an air duct for controlling a swell action, a reversing valve connected to said ducts, two air ducts leading from said reversing valve to a single opening in the tracker board, and a manually controlled valve in one of said last two mentioned ducts.

3. The combination of two sets of speaking devices, a tracker board, a set of air ducts for controlling one set of speaking devices, a set of air ducts for controlling the other set of speaking devices, two corresponding sets of air ducts connected by a single set of openings in the tracker board, and means for alternately connecting said first two mentioned sets of ducts with said last two mentioned sets of ducts.

4. The combination of a tracker board having a set of tracker openings, two sets of air ducts connected to said openings, one duct of each set being connected to a single opening, manually controlled valves in one of said sets of ducts, two other sets of air ducts, and a set of reversing valves for connecting the ducts of one of said first mentioned sets with the ducts of one of said second mentioned sets in direct and reverse manner, and means for independently opening any number of said manually controlled valves.

5. The combination of a tracker board having a set of tracker openings, two sets of air ducts connected to said openings, one duct of each set being connected to a single opening, manually controlled valves in one of said sets of ducts, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner.

6. The combination of a tracker board having tracker openings, two air ducts connected to a single opening in the tracker board, a manually controlled valve in one duct, two air ducts adapted to be operatively connected to said first mentioned ducts, and means for connecting one of said first mentioned ducts with one of said last mentioned ducts and the other of said first mentioned ducts with the other of said last mentioned ducts, in direct and reverse manner.

7. The combination of a tracker board, two sets of speaking devices, a set of air ducts for controlling one set of speaking devices, a set of air ducts for controlling the other set of speaking devices, two corresponding sets of air ducts controlled by a single set of openings in the tracker board, and means for alternately connecting said first two mentioned sets of ducts with said last two mentioned sets of ducts.

8. The combination of two air ducts, two air ducts adapted to be operatively connected to the first two air ducts and means for connecting one of said first mentioned ducts with one of said last mentioned ducts and the other of said first mentioned ducts with the other of said last mentioned ducts in direct and reverse manner, said means including a part removable from one position to another for making said connections and a spring tending to move said part to either of said positions after it has passed a predetermined point in its movement.

9. The combination of two air ducts, two air ducts adapted to be operatively connected to the first two air ducts and means for connecting one of said first mentioned ducts with one of said last mentioned ducts and the other of said first mentioned ducts with the other of said last mentioned ducts in direct and reverse manner, said means embracing a slide valve with its sliding part movable from one position to another for making said connections, a flat spring extending over said part and a link connection between said spring and said part whereby the spring tends to move said part to either of said positions after it has passed a predetermined point in its movement.

10. The combination of a tracker board, a reversing slide valve with its sliding part movable from one position to another, two air ducts leading from said valve to the tracker board, a manually controlled valve in one of said ducts, a spring for acting upon said sliding part, and a link interposed between said spring and part whereby the spring tends to move said part to either of said positions after it has passed a predetermined point in its movement.

11. The combination of a tracker board having a set of tracker openings, two sets of air ducts connected to said openings, one duct of each set being connected to a single opening, manually controlled valves in one of said sets of ducts, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner, said reversing valves having their movable parts movable toward their seats independently of one another.

12. The combination of a tracker board, two sets of air ducts connected thereto, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner, said reversing valves having sliding parts movable from one position to another for making said connections, said sliding parts being movable toward their seats independently of one another.

13. The combination of a tracker board, two sets of air ducts connected thereto, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner, said reversing valves having sliding parts movable from one position to another for making said connections, said sliding parts being movable toward their seats independently of one another and independent springs acting upon said parts, and links interposed between the springs and their corresponding parts whereby the springs tend to move said parts to either of said positions after they have passed a predetermined point in their movement.

14. The combination of a tracker board having tracker openings, two air ducts connected to a single opening in the tracker board, a manually controlled valve in one duct, two air ducts adapted to be operatively connected to said first mentioned ducts, and means for connecting one of said first mentioned ducts with one of said last mentioned ducts and the other of said first mentioned ducts with the other of said last mentioned ducts in direct and reverse manner and a pneumatic motor for maintaining said manually controlled valve closed.

15. The combination of a tracker board having tracker openings, two air ducts connected to a single opening in the tracker board, a manually controlled valve in one duct, two air ducts adapted to be operatively connected to said first mentioned ducts and pneumatic means for normally maintaining said manually controlled valve in one of its positions.

16. The combination of a tracker board, two sets of air ducts connected thereto, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner, said reversing valves having sliding parts removable from one position to another for making said connections, said sliding parts being movable toward their seats independently of one another, and a member, the movement of which causes all of said sliding parts to move simultaneously.

17. The combination of a tracker board having a set of tracker openings, two sets of air ducts connected to said openings, one duct of each set being connected to a single opening, manually controlled valves in one of said sets of ducts, two other sets of air ducts, and a set of reversing valves for connecting the ducts of one of said first mentioned sets with the ducts of one of said second mentioned sets, and the ducts of the other of said first mentioned sets with the ducts of the other of said second mentioned sets in direct and reverse manner, said reversing valves embracing an independent sliding member for each valve, and a member, the movement of which causes all of said sliding members to move simultaneously to reverse the connections.

18. The combination of two sets of speaking devices, a tracker board, a set of air ducts for controlling one set of speaking devices, a set of air ducts for controlling the other set of speaking devices, two corresponding sets of air ducts connected by a single set of openings in the tracker board, means for alternately connecting said first two mentioned sets of ducts with said last two mentioned sets of ducts, said means including a plurality of sliding valve closures and a member, the movement of which causes all of said sliding valve closures to reverse the connections.

19. The combination of a tracker board, two sets of speaking devices, a set of air ducts for controlling one set of speaking devices, a set of air ducts for controlling the other set of speaking devices, two corresponding sets of air ducts controlled by a single set of openings in the tracker board, and means for alternately connecting said first two mentioned sets of ducts with said last two mentioned sets of ducts, and a set of manually controlled valves in one of said sets of ducts.

20. The combination of a tracker board, two sets of speaking devices, a set of air ducts for controlling one set of speaking devices, a set of air ducts for controlling the other set of speaking devices, two corresponding sets of air ducts controlled by a single set of openings in the tracker board, and means for alternately connecting said first two mentioned sets of ducts with said last two mentioned sets of ducts, and a set of manually controlled valves in one of said sets of ducts, and means for independently opening any number of said manually controlled valves.

21. The combination of a tracker board, two sets of speaking devices, a set of air ducts for controlling one set of speaking devices, a set of air ducts for controlling the other set of speaking devices, two corresponding sets of air ducts controlled by a single set of openings in the tracker board, and means for alternately connecting said first two mentioned sets of ducts with said last two mentioned sets of ducts, said means embracing a plurality of reversing valves each having their moving parts movable toward their seats independently of one another.

22. The combination of a tracker board, two sets of speaking devices, a set of air ducts for controlling one set of speaking devices, a set of air ducts for controlling the other set of speaking devices, two corresponding sets of air ducts controlled by a single set of openings in the tracker board, and means for alternately connecting said first two mentioned sets of ducts with said last two mentioned sets of ducts, said means embracing a plurality of reversing valves each having their moving parts movable toward their seats independently of one another, and a set of manually controlled valves in one of said sets of ducts.

23. The combination of two sets of speaking devices, a tracker board, two sets of air ducts in operative relation with the tracker board, two sets of air ducts for controlling the operation of said sets of speaking devices respectively, and means for alternately connecting said first two mentioned sets of ducts with said last two mentioned sets of ducts in direct and reverse manner, said means including a set of slidable valve closures, said closures being movable toward their seats independently of one another.

24. The combination of two sets of air ducts, two other sets of air ducts, and means for alternately connecting said first two mentioned sets of ducts with said last two mentioned sets of ducts in direct and reverse manner, said means including a set of movable valve closures, said closures being movable toward their seats independently of one another.

25. The combination of two sets of air ducts, and means for connecting the ducts of one set with the ducts of the other set, said means including a set of movable valve closures, each adapted to slide over its respective valve seat and said closures being movable toward their seats independently of one another.

26. The combination of two sets of air ducts, means for connecting the ducts of one set with the ducts of the other set, said means comprising a plurality of valves, the closures of which slide over their respective valve seats and each valve closure being independently movable toward its seat, and means tending to press each valve independently toward its seat.

27. The combination of two sets of air ducts, means for connecting the ducts of one set with the ducts of the other set, said means including a set of movable valve closures, adapted to slide over their respective valve seats and being movable toward their seats independently of one another, means tending to press each valve independently toward its seat, and means for opening and closing said valves simultaneously.

28. The combination of two sets of air ducts, means for connecting the ducts of one set with the ducts of the other set, said means comprising a plurality of valves, the closures of which slide over their respective valve seats and each valve closure being independently movable toward its seat, and means for opening and closing said valves simultaneously.

In testimony whereof, I have signed my name to this specification, in the presence of two subscribing witnesses.

JOSEPH SCHWERTNER.

Witnesses:
GORHAM CROSBY,
EDWIN SEGAR.

Copies of this patent may be obtained for five cents each, by addressing the "Commissioner of Patents, Washington, D. C."